(12) United States Patent
Valiente

(10) Patent No.: US 10,009,467 B1
(45) Date of Patent: Jun. 26, 2018

(54) AUTOMATIC TELEPHONE CALL BRIDGE INTO A QUEUE

(71) Applicant: Andrew Valiente, Walnut, CA (US)

(72) Inventor: Andrew Valiente, Walnut, CA (US)

( * ) Notice: Subject to any disclaimer, the term of this patent is extended or adjusted under 35 U.S.C. 154(b) by 0 days. days.

(21) Appl. No.: 15/881,794

(22) Filed: Jan. 28, 2018

Related U.S. Application Data

(60) Provisional application No. 62/451,428, filed on Jan. 27, 2017.

(51) Int. Cl.
| | |
|---|---|
| *H04M 3/00* | (2006.01) |
| *H04M 15/00* | (2006.01) |
| *H04M 3/523* | (2006.01) |
| *H04M 3/493* | (2006.01) |
| *G06Q 30/04* | (2012.01) |
| *H04M 3/428* | (2006.01) |
| *H04M 1/64* | (2006.01) |
| *H04M 3/51* | (2006.01) |

(52) U.S. Cl.
CPC .......... *H04M 3/5231* (2013.01); *G06Q 30/04* (2013.01); *H04M 1/64* (2013.01); *H04M 3/428* (2013.01); *H04M 3/493* (2013.01); *H04M 3/5166* (2013.01)

(58) Field of Classification Search
USPC .......................... 379/265.01, 266.01, 114.01
See application file for complete search history.

(56) References Cited

U.S. PATENT DOCUMENTS

| 8,139,753 B2* | 3/2012 | Pickering ............ H04M 3/5183 379/110.01 |
| 8,554,218 B2 | 10/2013 | Gisby et al. |
| 9,197,479 B2* | 11/2015 | Altberg ............. H04L 29/06027 |
| 2007/0219816 A1* | 9/2007 | Van Luchene ......... G06Q 10/06 705/80 |
| 2008/0263459 A1* | 10/2008 | Altberg ................. G06Q 50/00 715/757 |
| 2008/0292076 A1* | 11/2008 | Krishnamurthy ..... H04M 3/428 379/114.05 |
| 2014/0016767 A1* | 1/2014 | Oristian ............... H04M 3/5231 379/265.09 |
| 2016/0234390 A1* | 8/2016 | Roncoroni ........ H04M 3/42059 |

* cited by examiner

*Primary Examiner* — Quoc D Tran
(74) *Attorney, Agent, or Firm* — Patent Law Offices of Rick Martin, P.C.

(57) ABSTRACT

Providing an artificial intelligence robot controller that connects the controller to a plurality of incoming dial up phone numbers of an entity (such as the IRS) which entity usually puts incoming calls on hold for long periods of time such as an hour. The user of the service is connected to an existent connected phone line to the entity so as to shorten the expected wait time for reaching the customer service representative. Optionally the user can bid out the position to grab the next answered line in front of other users. Another embodiment enables a software user to click a button which triggers a request to the robot to connect that software user to the next available phone line to the entity. Another embodiment allows any client to place an order with the robot to call the client back upon securing a connection with the entity.

20 Claims, 16 Drawing Sheets

Customers Calling the EnQ System Take the Place of the EnQ Robot Calls And Skip the Hold Time EnQ System Overview
Pseudo 3-way call between Call Center (Leg 1) and Customer (Leg

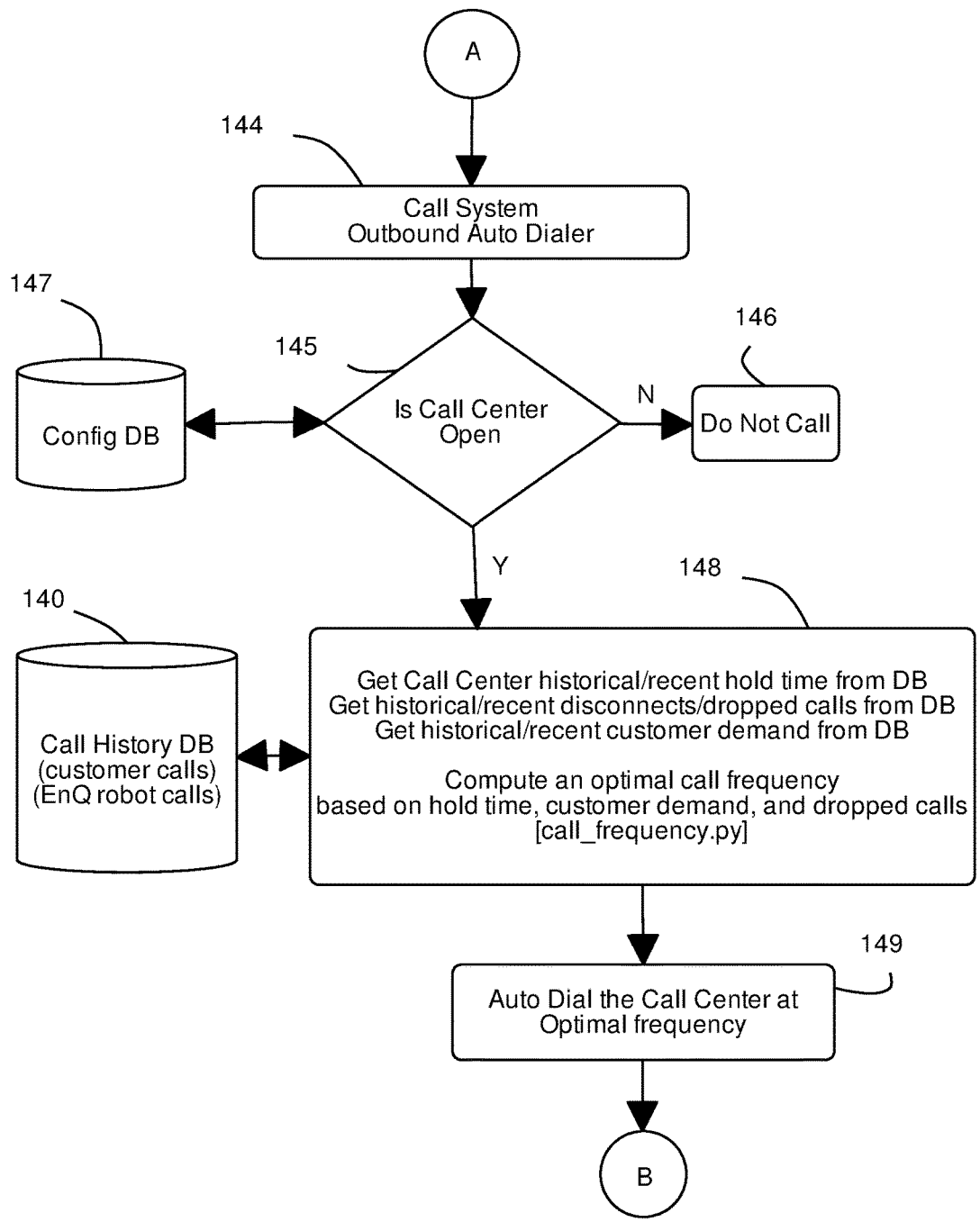

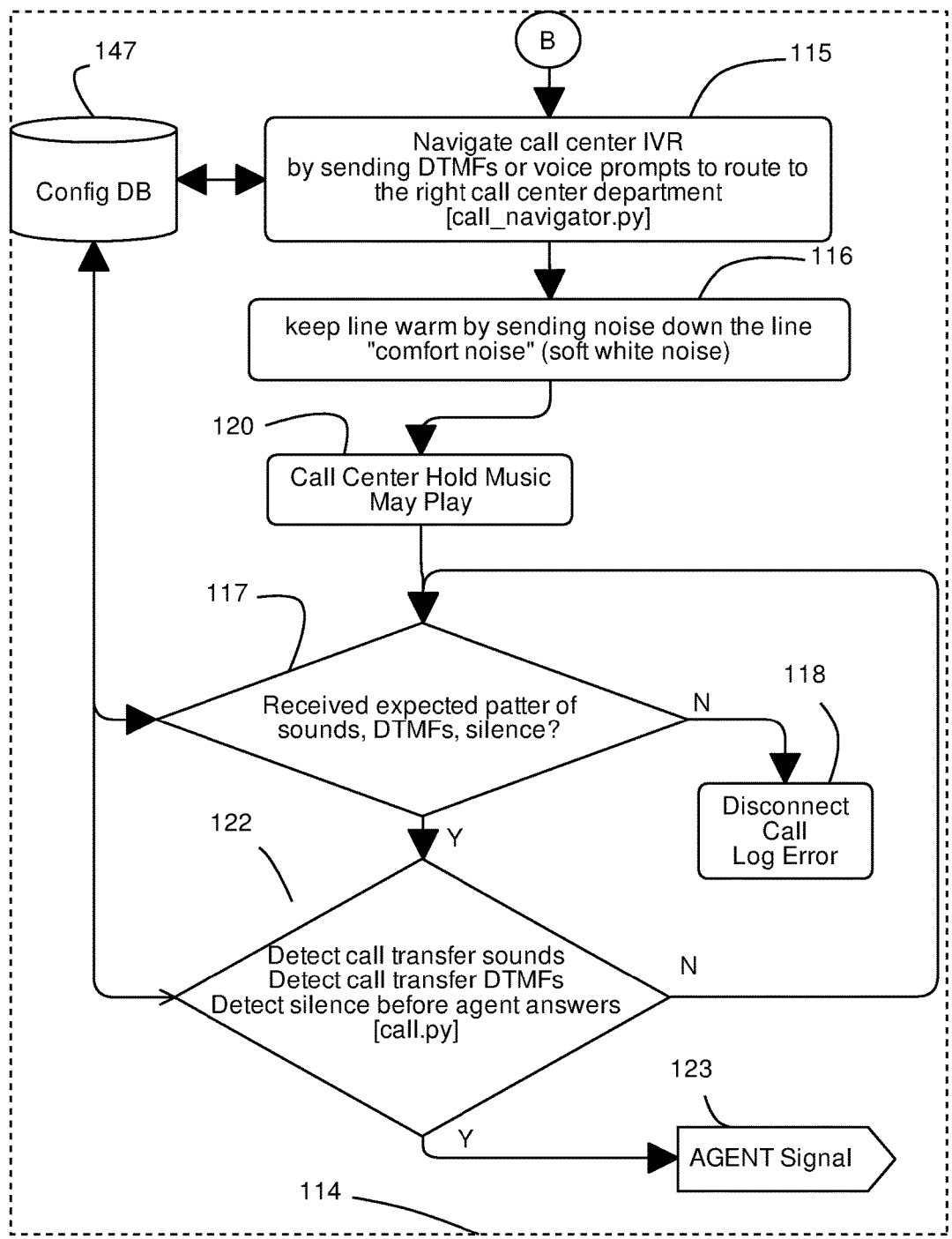

Call Center Agent Being Reached and Agent Signal Fired

Both Customer and Agent are Ready to Be Bridged Together

Bridging Customer and Agent Together Followed By Completed Call Post Processing

Customer Calls the EnQ System And Validates Their Credentials

EnQ System Handling Inbound Customer Call

Customer Requests Callback from EnQ Call System

EnQ System Callback Call to Customer
Customer Connected First and Waits for Call Center Agent

EnQ System Callback Call to Customer After Connecting to Agent

Initiating Customer Callback After Reaching Agent

External Application interface

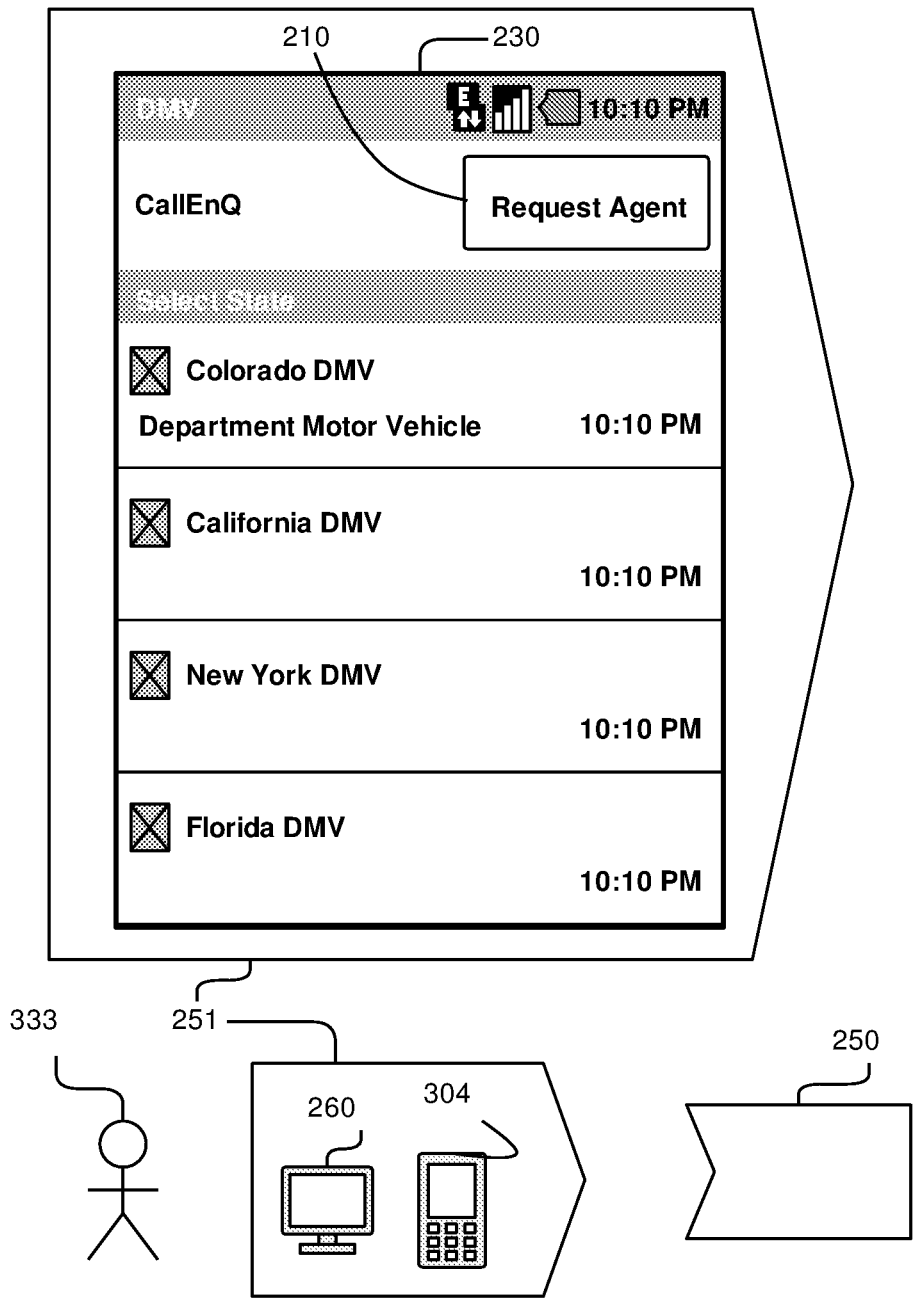

Customers Calling the EnQ System Take the Place of the EnQ Robot Calls And Skip the Hold Time

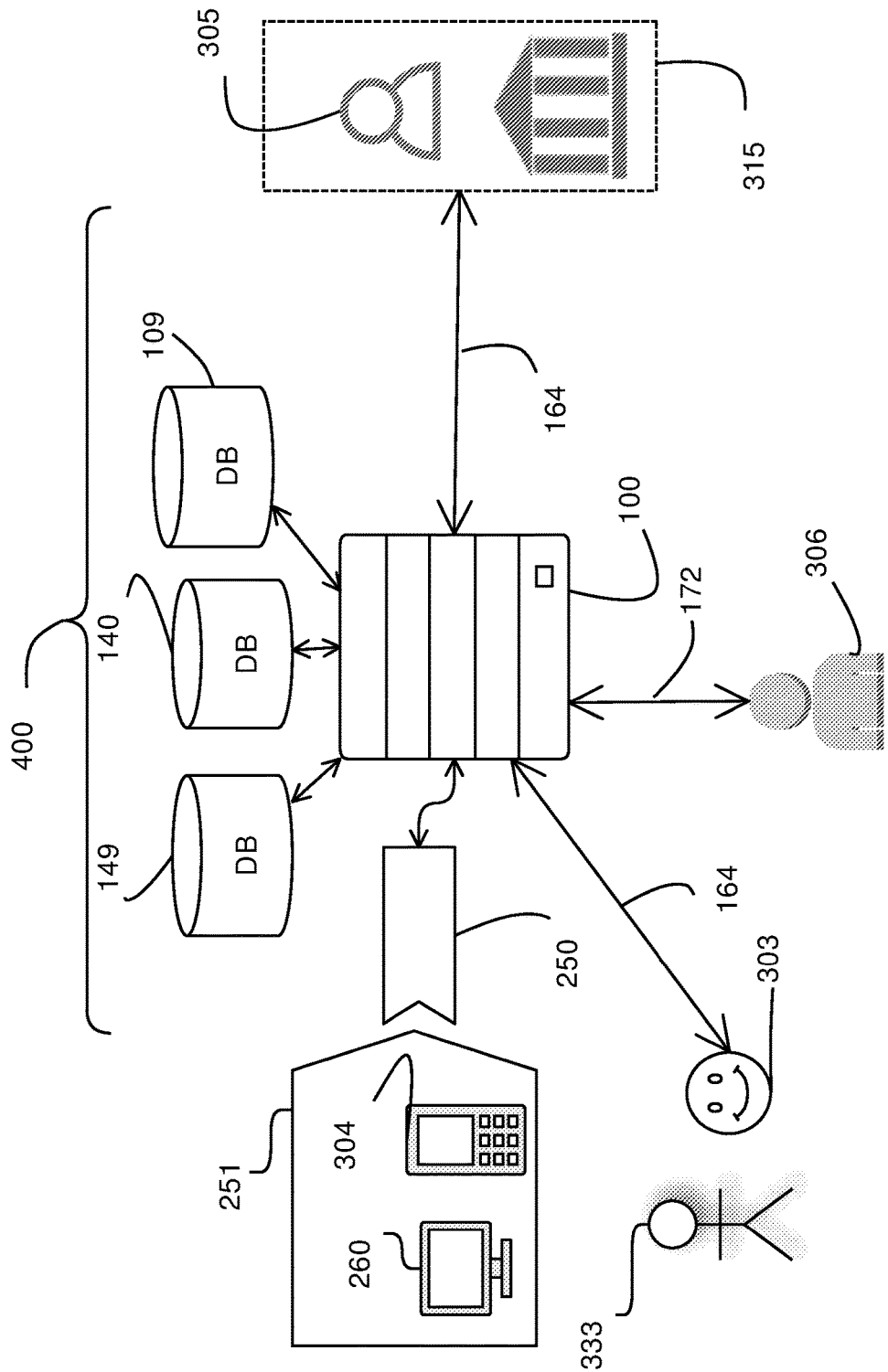

AUTOMATIC TELEPHONE CALL BRIDGE INTO A QUEUE

CROSS-REFERENCED PATENTS

This non-provisional application claims priority from provisional application No. 62/451,428 filed Jan. 27, 2017, and said provisional application is incorporated herein by reference in its entirety.

FIELD OF THE INVENTION

The present invention relates to placing a user call to a robot controller into an existing phone line from the robot controller which is already on hold to a customer service entity.

BACKGROUND

During tax season many Americans will be turning to the IRS for help. Unfortunately for them, the IRS has not been very efficient or effective in answering calls. According to the treasury Inspector General for Tax Administration, the IRS has fielded only 6.3 million calls out of a total of 40.5 million attempted calls, a total of 15.6 percent.

Last tax season wasn't much better in comparison. According to the Taxpayer Advocate Service, during the thick of tax season of 2015, only 37 percent of calls made to the IRS reached customer service representatives. With an average wait time of 23 minutes, and "courtesy disconnects" that would end the call when no representatives were able to take the call, only added to a caller's frustration. To make matters worse, the IRS abolished the option to leave a voicemail requesting an in-person meeting. They now force taxpayers to send an email requesting such appointments, placing a burden upon the elderly, disabled, and those without email access.

Waiting on hold is always aggravating. But calling the Internal Revenue Service can be especially frustrating because you are nearly guaranteed a long hold time, assuming you can get a human being on the line at all. In the fiscal year that ended Sep. 30, 2015, a Government Accountability office (GAO) report noted that the IRS provided "the lowest level of telephone service compared to prior year, with only 38 percent of callers who wanted to speak with an IRS assistor able to reach one". "This lower level of service occurred despite a fall in demand, and average wait times still topped 30 minutes." Rep. Kevin Brady, R-Texas, responds to the report by observing that "reaching an IRS employee often seems as unlikely as winning Powerball." Much of the lack of service is due to inefficiencies at the IRS and to budget cuts.

It is in this environment that the present invention "EnQ" has arrived. A newly launched service, EnQ delivers on its promises to let users "cut the queue" and get in touch with an IRS agent for a fee. The concept is familiar to amusement park patrons. Disney has their Fast pass and Six Flags offers the Flash pass. The idea of having someone else wait on hold for you is not, in itself, an innovation. Several companies offer some form of this service. Virtual Hold technology was founded in 1995 and pioneered the idea of having a call central call a customer rather than forcing them to wait on hold.

Lucy Phone, founded in 2010, allows customers to call a company and then hand off the call if they are put on hold. The service calls the customer back once a customer service agent picks up. A competitor, Fast Customer, is an app that works in a similar way. Lucy Phone and Fast Customer are free for consumers to use. However, the IRS has explicitly instructed its agents not to accept calls from Lucy Phone, Fast Customer or similar services. While there are other services trying to reduce or eliminate hold times for customers, EnQ is different not only in its focus, but in its methods. Callback-based services do not actually decrease the time between when you initiate a call and when you speak with a representative; they just free you to do other things while you are waiting. What is needed in the art is for a robot to initiate a call to the IRS before the robot has a customer to hand off the call to. It then offers to sell its place in line. The fees are based on the caller's time on the IRS line, which is almost equal to the "talk time" with the IRS.

The present invention does this process, called "EnQ". Much as some airlines allow frequent fliers to call a separate customer service line or credit cards sometimes have shorter waits for holders of elite level cards, it might at first seem intuitive that those willing to pay a premium can reduce or eliminate hold times.

EnQ allows its customers to eliminate the risk of IRS "courtesy disconnects", which is when the IRS hangs up on the caller because of overloading. The IRS, in their infinite wisdom, will hang up on callers who have patiently waited 2 hours because they are unable to take their call at that time. These callers do not get a credit for their lost time and will need to call again starting from the back of the queue and risk being disconnected again. The risk of a courtesy disconnect is more substantial during waiting on hold, hold music phase. The risk of a disconnect decreases significantly once the IRS customer service agent answers the phone. With the present invention, the courtesy disconnects still occur, but that is EnQ's burden to bear and shield their customers from this frustration. EnQ's customers wait in the EnQ inbound queue until a confirmed connection to the IRS is established, and then EnQ gives its line to the customer. Thus EnQ saves its customers the aggravation of having to call the IRS over and over again from the suffering from IRS' courtesy disconnect. This invention not only decreases the customer's hold time but also mitigates the risk of the customer experiencing courtesy disconnects.

An alternate implementation of this invention is a callback service. A customer notifies the EnQ system, perhaps through a website, a wish to talk to the call center (IRS). The EnQ system would then wait for a connection to the call center and immediately call the customer. In this implementation, the customer would not have to call EnQ nor wait the few minutes of EnQ hold time.

EnQ's founder claims that the volume of calls it initiates is so small it won't appreciably impact IRS wait times. IRS wait times are a real problem that government officials should address, but EnQ is poised to make the wait times shorter for its customers. Other customer service centers such as the VA, social security or Medicaid or civilian agencies may be improved with this invention.

SUMMARY OF THE INVENTION

The main aspect of the present invention is to provide a phone robot that is continuously on hold with a call center and simultaneously alway at the queue.

Another aspect of the present invention is to maintain a plurality of calls on hold to the call center.

Another aspect is offer these pre-existing calls on hold to customers who wish to cut their hold time. The EnQ system will bridge a customer's call with the EnQ robot call and thus saving the customer hold time. The invention allows a customer to buy his way to the front queue by passing other users who are waiting on hold for a call center agent.

Another aspect of the invention is that the EnQ robot preemptive calls were placed on hold even before the customer needed to contact the call center.

Call centers are known to be unreliable and drop or disconnect calls. A caller may be on hold for an hour and then get disconnected. Another aspect of this present invention is to eliminate the drop call possibility from the customer's perspective. This is achieved because the customer only joins calls that have connected with agents.

Another aspect of the present invention is to allow a callback service to the customer on their request via voice, web, mobile, or Desk application. The customer would send a callback request to the EnQ system, which would call back the customer.

Another aspect of the present invention is to provide an algorithm to detect when a call on hold will be answered by a breathing human call center agent.

Another aspect of the present invention is to prevent the customer service agent from receiving a dead call.

Another aspect of the present invention is to provide a certified transcription service to record and transcribe the words of the call.

Another aspect of the present invention is to provide a bridge to third-party conference.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 4 is a graphic of the network diagram of the EnQ system, customer, and website.

Figure 1A:
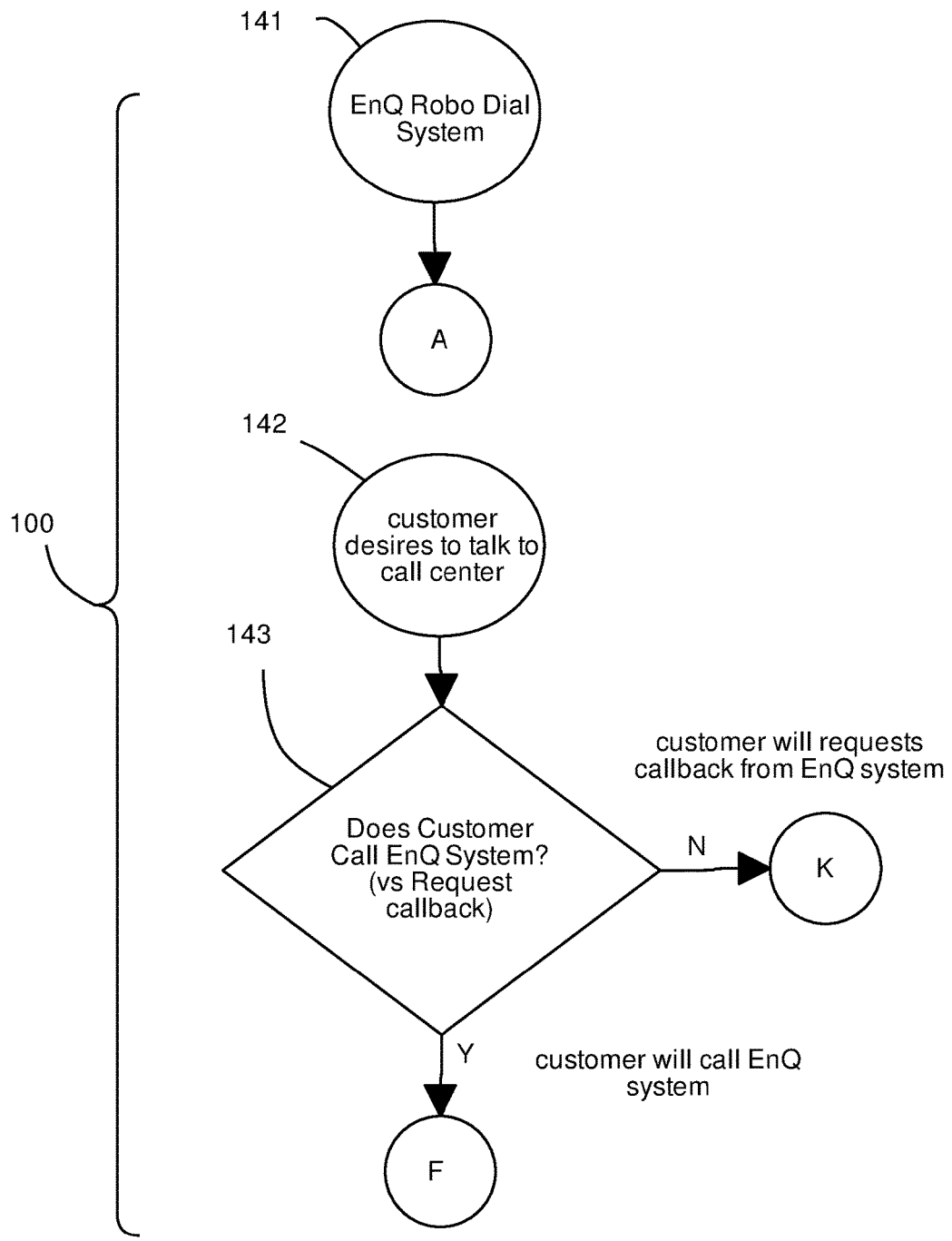
FIG. 1 is a flowchart of events of the EnQ system bridging a customer call and a call center call with the goal of reducing the customer's hold time.
Figure 1D:
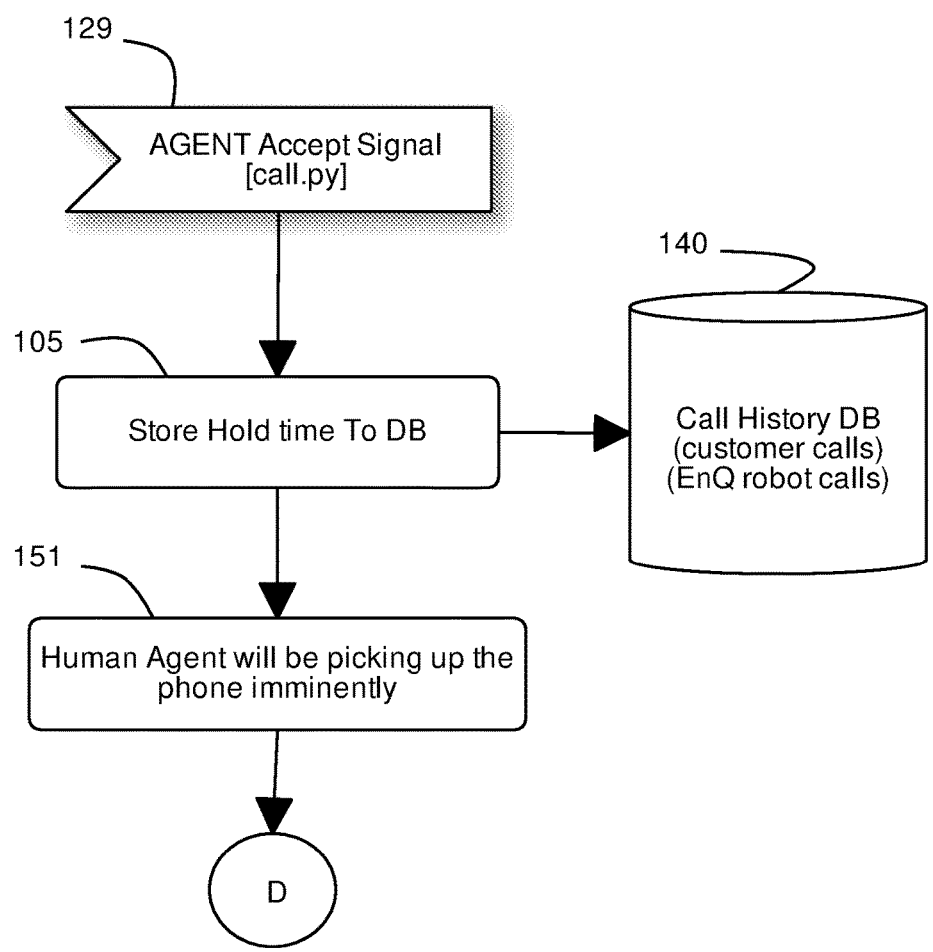
Figure 1E:
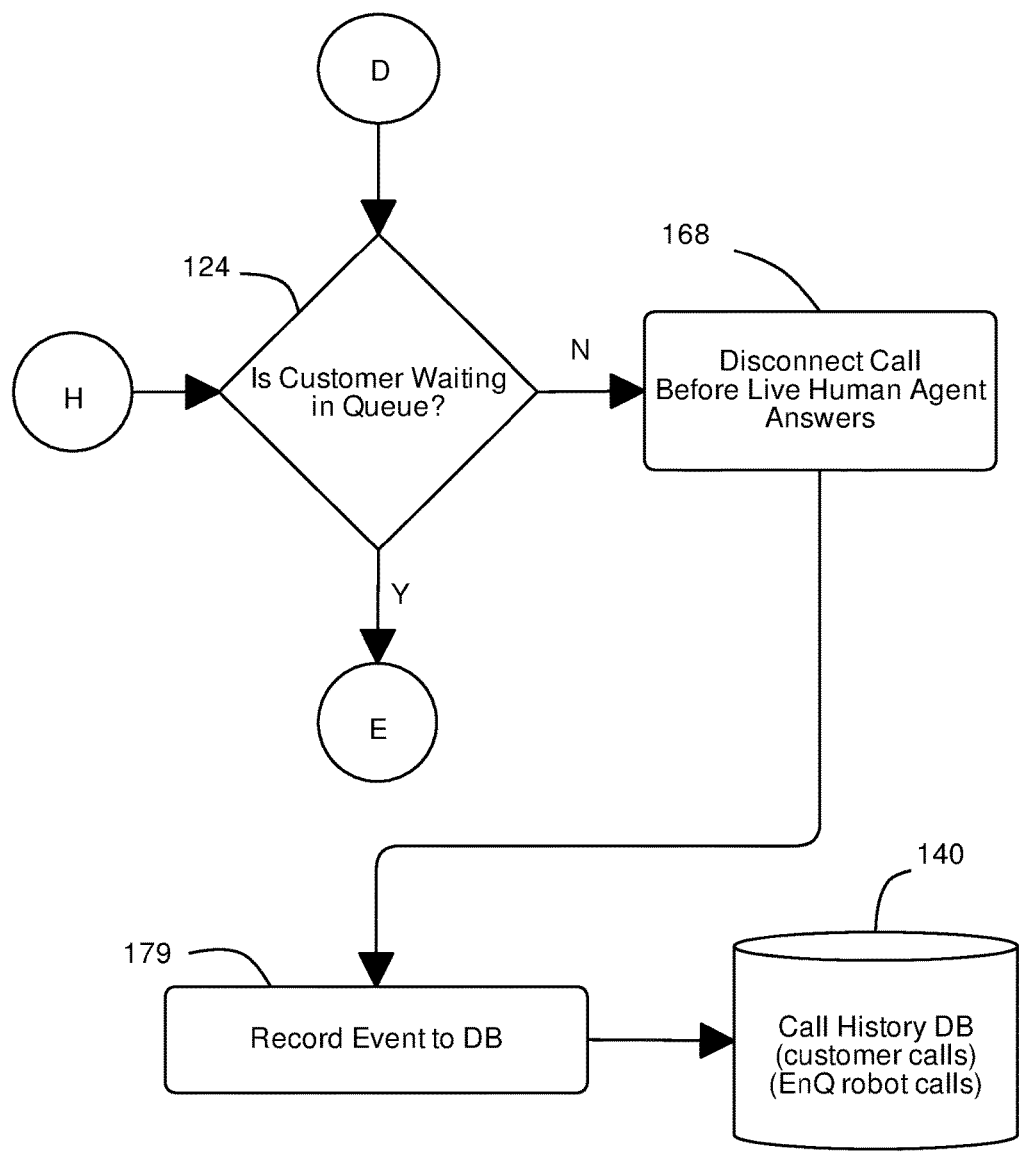
Figure 1F:
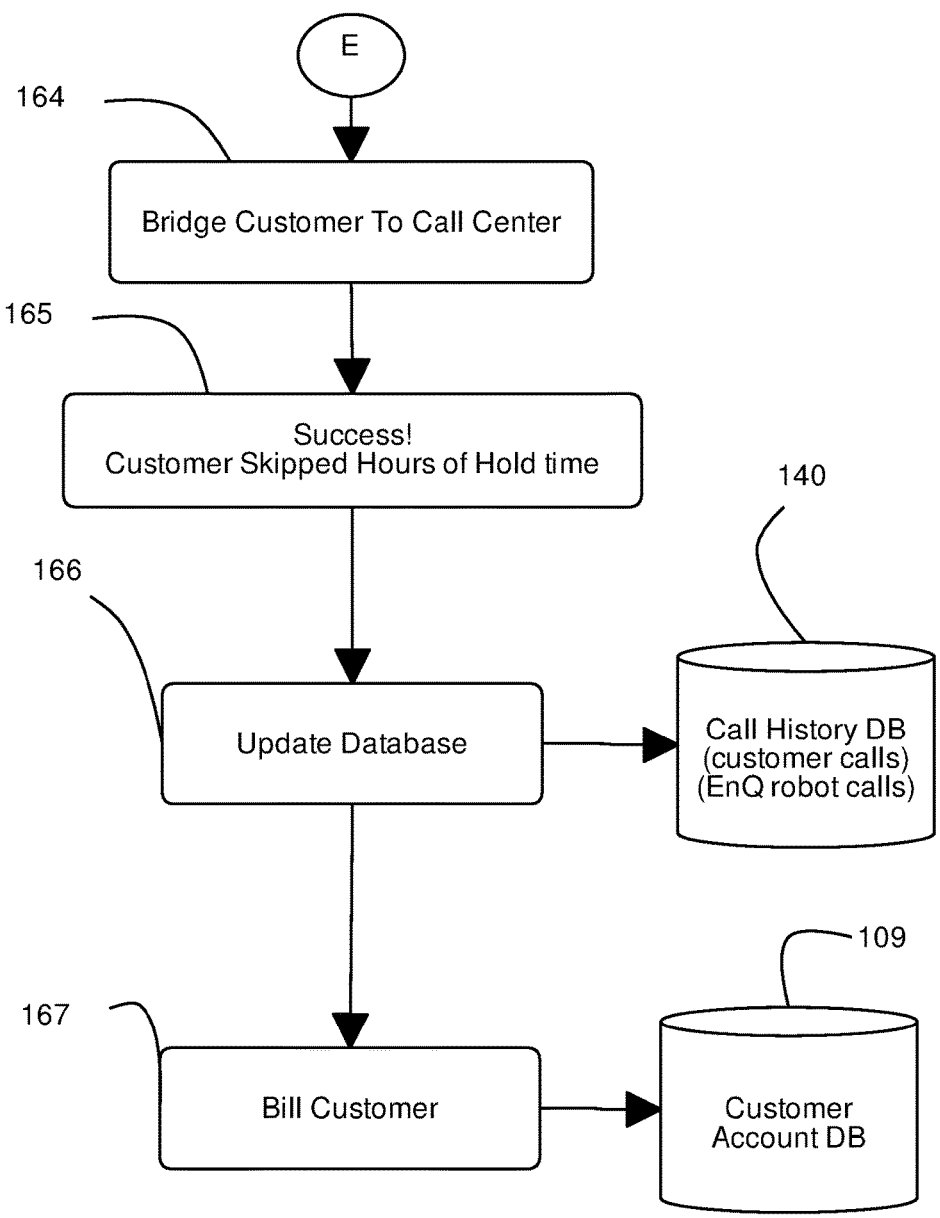
Figure 1G:
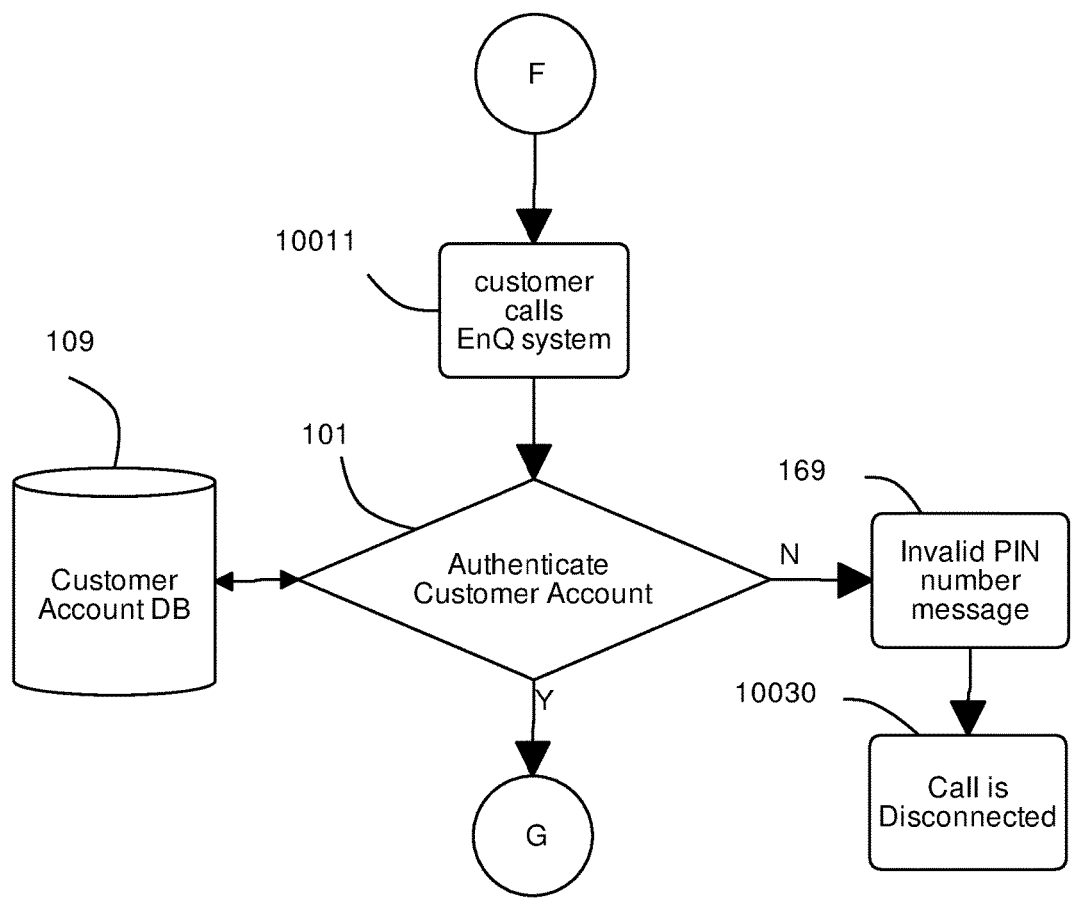
Figure 1H:
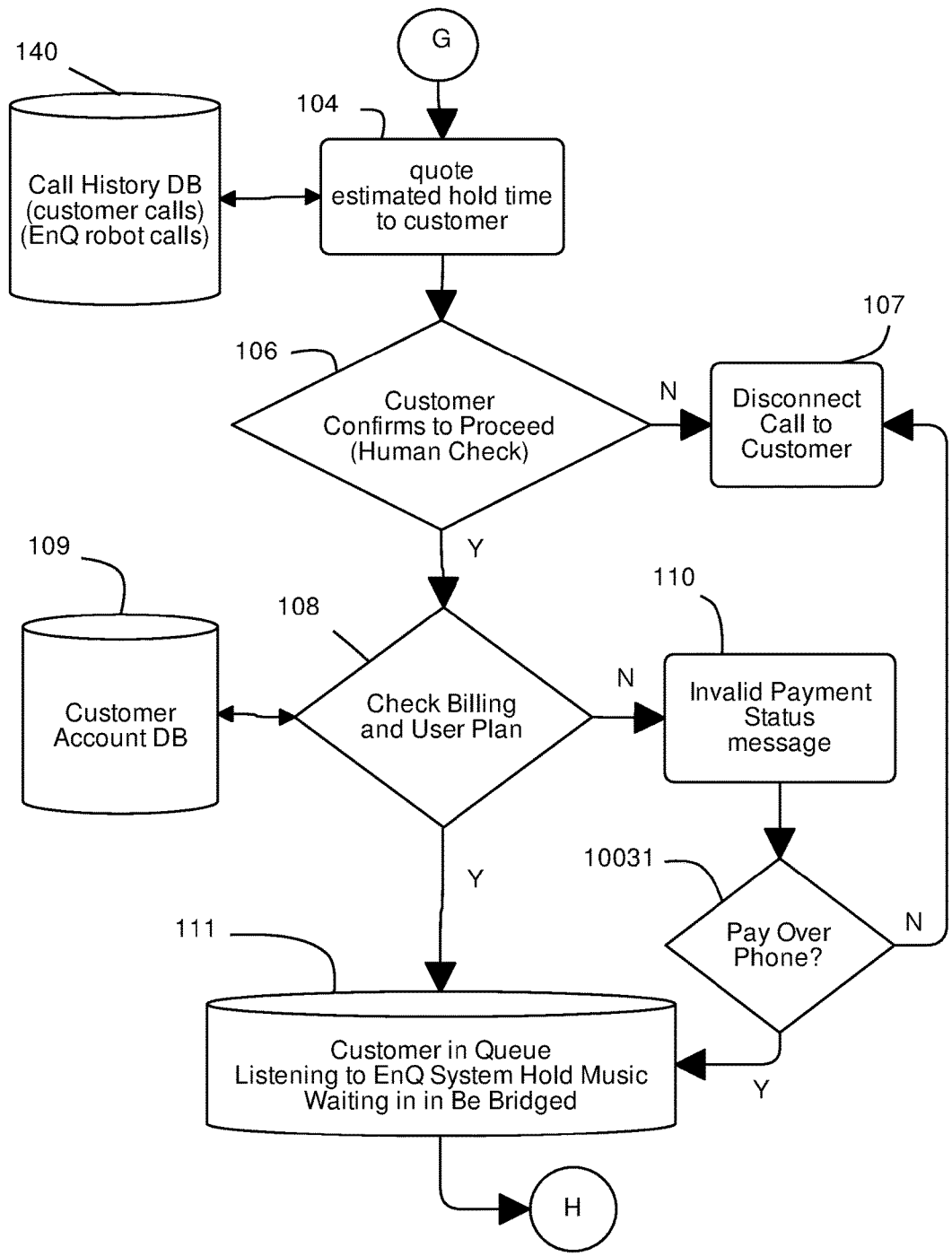
Figure 1I:
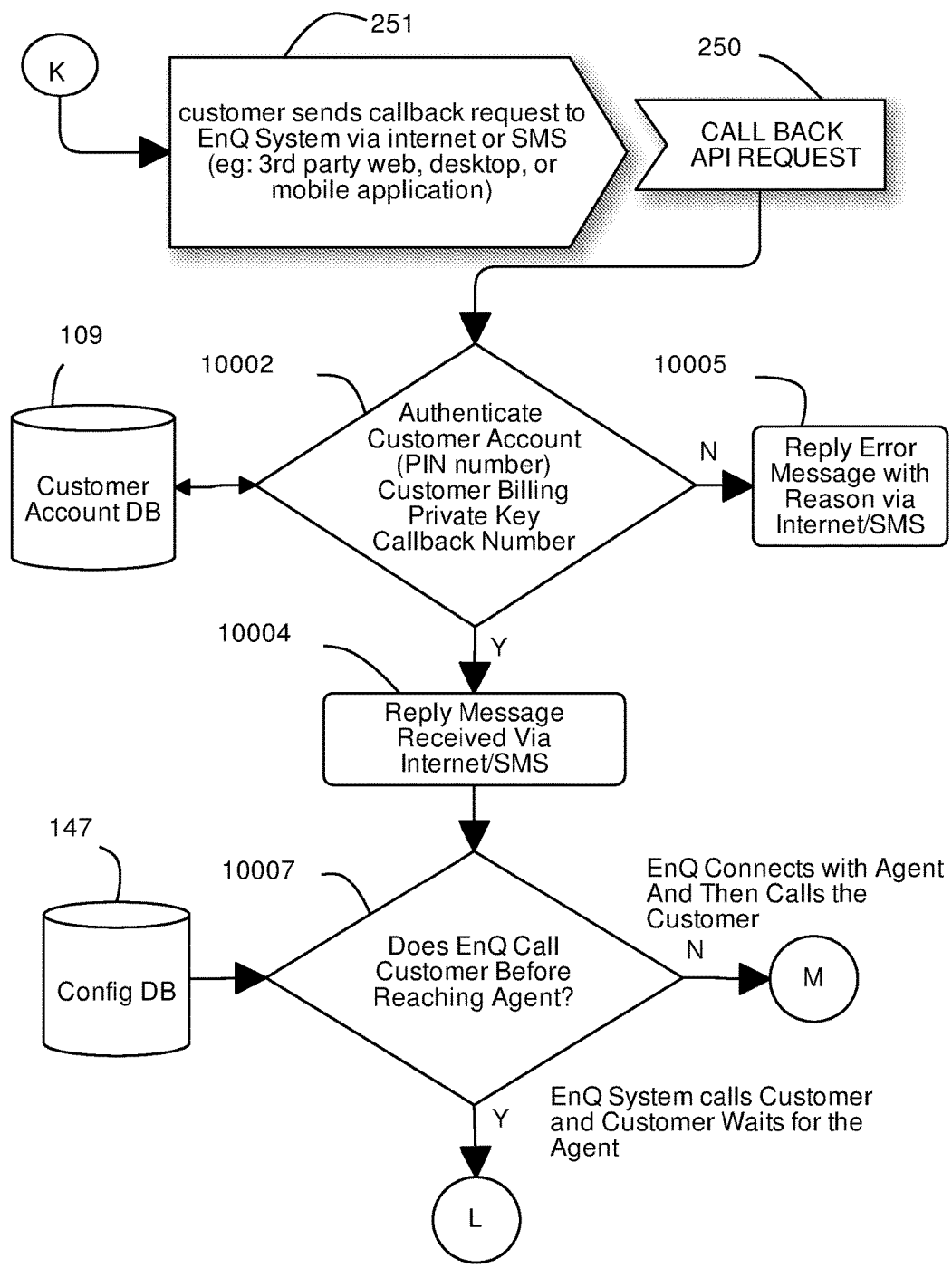
Figure 1J:
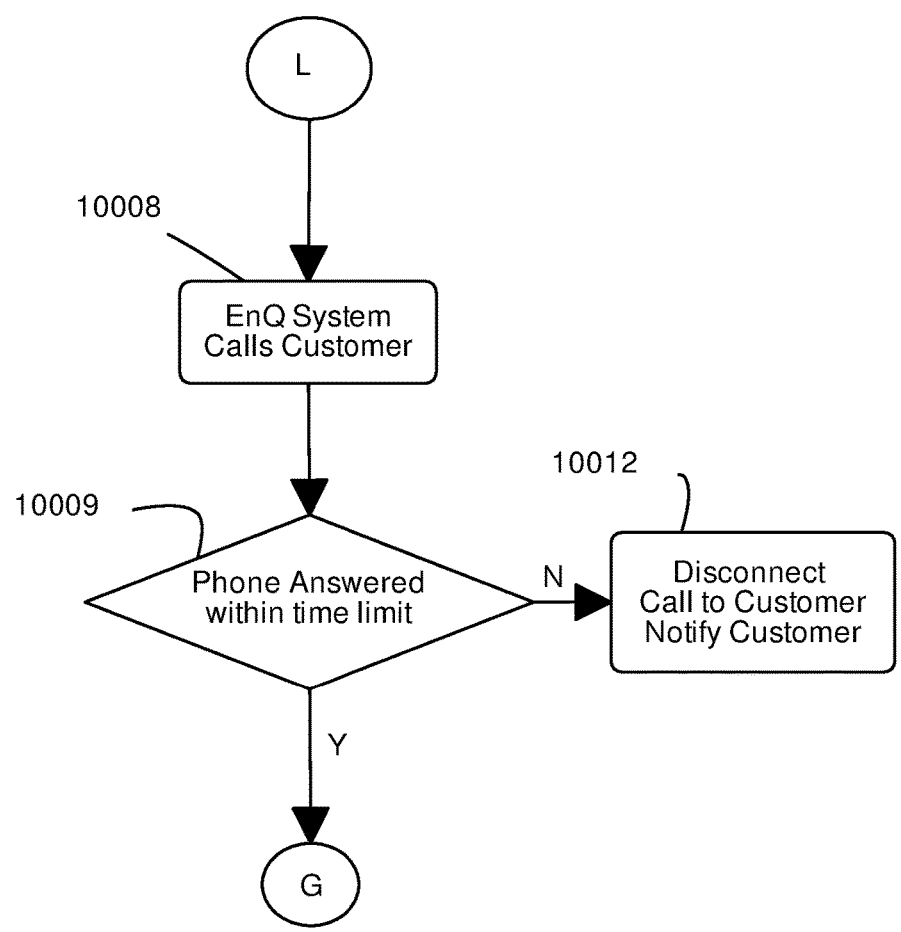
Figure 1K:
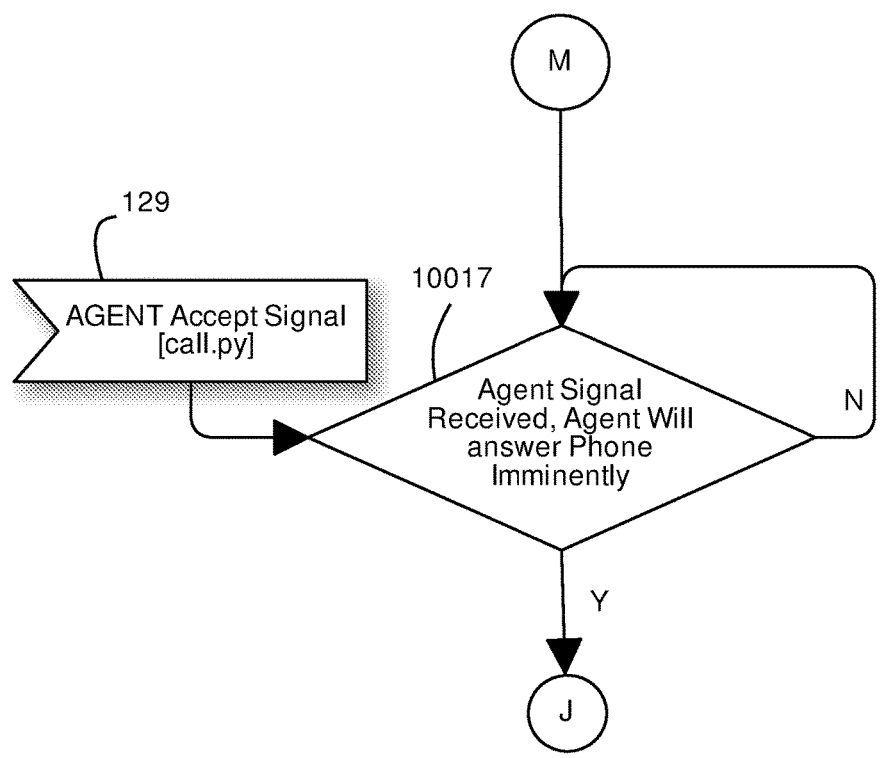
Figure 1L:
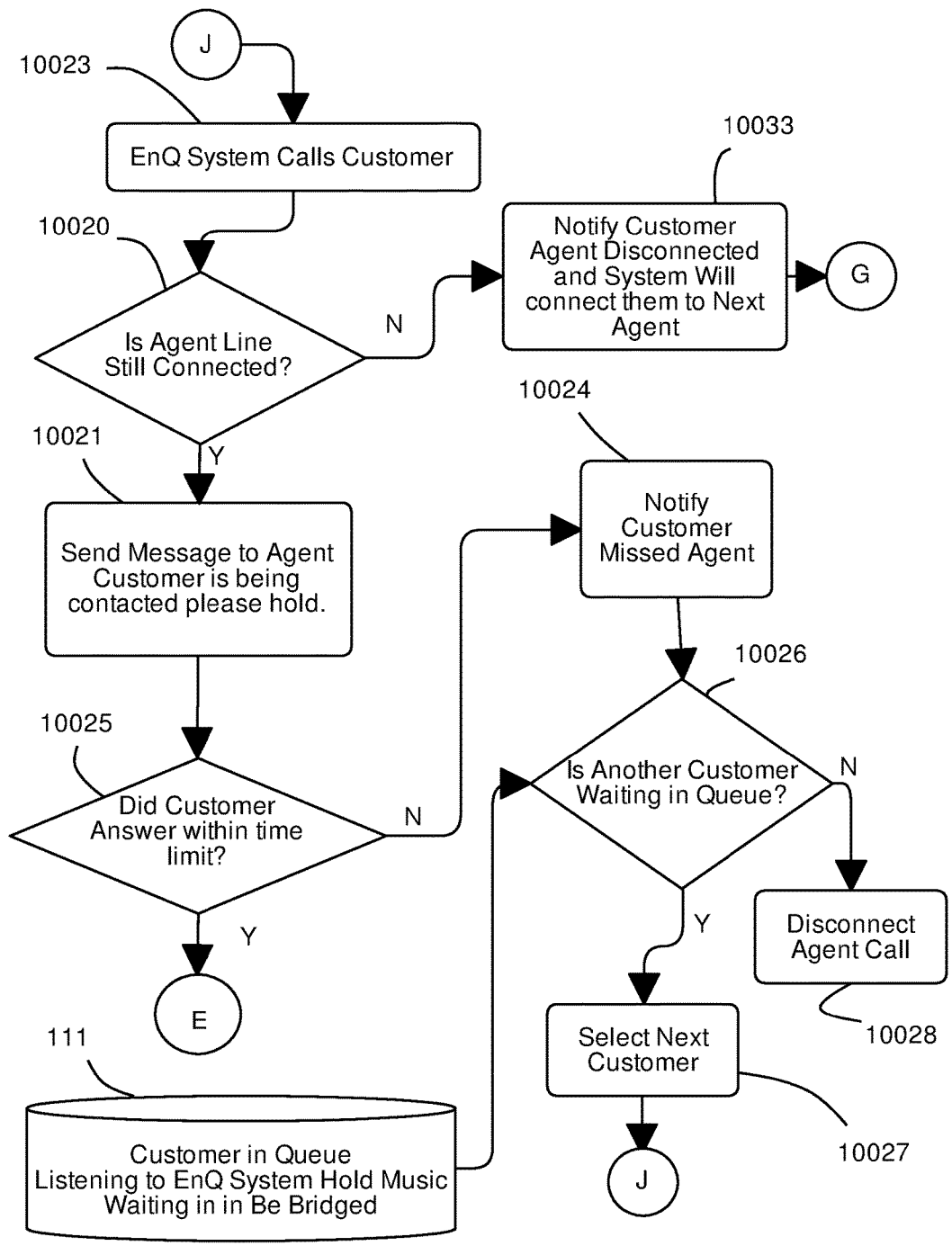

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Glossary

Application Programming Interface (API) is a set of communication protocols between softwares components are systems. An API allows a system to access and or embed functionality from another another system. Most APIs limit access by private keys for security. In web applications it is common for websites to use APIs for user authentication and credit card processing.

Direct Inward Dialing (DID) is a telecommunication service offered by phone companies to subscribers who operate a private branch exchange (PBX). The service consists of one or more telephone numbers that will transmit calls dialed to that telephone number to that PBX so the call can be received. When the the user in the PBX makes an outbound call from that number, the telephone number provided can be added to the phone call to display as the caller id.

A Dual Tone Multi Frequency (DTMF) is an in-band telecommunication signaling system using the voice-frequency band over telephone lines between telecommunication devices such as phones. In most phones, this refers to the keypad numbers 0-9 and the symbols "*" and "#". When pressing the keypad, a touch-tone DTMF signal is sent to the other party of the phone call.

A HASH is a cryptographic function allows one to easily verify that some input data maps to a given specific alpha-numeric string called a hash value. But if the input data is unknown, it is deliberately difficult to reconstruct it (or equivalent alternatives) by knowing the stored hash value. This is used for assuring integrity of transmitted data, and is the building block for Hash Message Authentication Codes (HMACs), which provide message authentication.

Hypertext Transfer Protocol (HTTP) is a secure communication protocol between computers that is encrypted by Transport Layer Security (TLS). The purpose of HTTPS authentication when accessing a website is to protect the privacy and integrity of the exchanged data from man-in-the-middle attackers or eavesdroppers. HTTPS is well adopted standard when exchanging high confidential information with a website. For example, free email providers or banking websites will offer HTTPS to encrypt the communication with the user for their privacy.

Interactive voice response (IVR) is a technology that allows a computer to interact with humans through the use of voice and DTMF tones input via keypad. In telecommunications, IVR allows customers to interact with a company's host system via a telephone keypad or by speech recognition, after which services can be inquired about through the IVR dialogue. IVR systems can respond with prerecorded or dynamically generated audio to further direct users on how to proceed. IVR systems deployed in the network are sized to handle large call volumes and are also used for outbound calling, as IVR systems are more intelligent than many predictive dialer systems.

IVR systems can be used for mobile purchases, banking payments and services, retail orders, utilities, travel information and weather conditions. A common misconception refers to an automated attendant as an IVR. The terms are distinct and mean different things to traditional telecommunications professionals-the purpose of an IVR is to take input, process it, and return a result, whereas the job of an automated attendant is to route calls. The term voice response unit (VRU), is sometimes used as well.

Despite the increase in IVR technology during the 1970s, the technology was considered complex and expensive for automating tasks in call centers. Early voice response systems were Digital Signal Processing (DSP) technology based and limited to small vocabularies. In the early 1980s, Leon Ferber's Perception Technology became the first mainstream market competitor, after hard drive technology (read/write random-access to digitized voice data) had reached a cost effective price point. At that time, a system could store digitized speech on disk, play the appropriate spoken message, and process the human's DTMF response.

As call centers began to migrate to multimedia in the late 1990s, companies started to invest in computer telephony integration (CTI) with IVR systems. IVR became vital for call centers deploying universal queuing and routing solutions and acted as an agent that collected customer data to enable intelligent routing decisions. With improvements in technology, systems could use speaker-independent voice recognition of a limited vocabulary instead of requiring the person to use DTMF signaling.

Starting in the 2000s, voice response became more common and cheaper to deploy. This was due to increased CPU power and the migration of speech applications from proprietary code to the VXML standard. DTMF decoding and speech recognition are used to interpret the caller's response to voice prompts. Dual Tone Multi Frequency (DTMF) tones are entered via the telephone keypad.

Other technologies include using text-to-speech (TTS) to speak complex and dynamic information, such as e-mails, news reports or weather information. IVR technology is also being introduced into automobile systems for hands-free operation. TTS is computer generated synthesized speech that is no longer the robotic voice traditionally associated with computers. Real voices create the speech in fragments that are spliced together (concatenated) and smoothed before being played to the caller.

An IVR can be deployed in several ways:
1. Equipment installed on the customer premises
2. Equipment installed in the PSTN (public switched telephone network)
3. Application service provider (ASP)

An automatic call distributor (ACD) is often the first point of contact when calling many larger businesses. An ACD uses digital storage devices to play greetings or announcements, but typically routes a caller without prompting for input. An IVR can play announcements and request an input from the caller. This information can be used to profile the caller and route the call to an agent with a particular skill set. (A skill set is a function applied to a group of call-center agents with a particular skill.)

Interactive voice response can be used to front-end a call center operation by identifying the needs of the caller. Information can be obtained from the caller such as an account number. Answers to simple questions such as account balances or pre-recorded information can be provided without operator intervention. Account numbers from the IVR are often compared to caller ID data for security reasons, and additional IVR responses are required if the caller ID does not match the account record.

IVR call flows are created in a variety of ways. A traditional IVR depended upon proprietary programming or scripting languages, whereas modem IVR applications are generated in a similar way to Web pages, using standards such as VoiceXML, CCXML, SRGS and SSML. The ability to use XML-driven applications allows a web server to act as the application server, freeing the IVR developer to focus on the call flow. IVR speech recognition interactions (call flows) are designed using 3 approaches to prompt for—and recognize—user input: directed dialogue, open-ended, and mixed dialogue.

A directed dialogue prompt communicates a set of valid responses to the user (e.g. "How can I help you? . . . Say something like, account balance, order status, or more options"). An open-ended prompt does not communicate a set of valid responses (e.g. "How can I help you?"). In both cases, the goal is to glean a valid spoken response from the user. The key difference is that with directed dialogue, the user is more likely to speak an option exactly as was communicated by the prompt (e.g. "account balance"). With an open-ended prompt however, the user is likely to include extraneous words or phrases (e.g. "I was just looking at my bill and saw that my balance was wrong."). The open-ended prompt requires a greater degree of natural language processing to extract the relevant information from the phrase (i.e. "balance"). Open-ended recognition also requires a larger grammar set, which accounts for a wider array of permutations of a given response (e.g. "balance was wrong", "wrong balance", "balance is high", "high balance"). Despite the greater amount of data and processing required for open-ended prompts, they are more interactively efficient, as the prompts themselves are typically much shorter. A mixed dialogue approach involves shifting from open-ended to directed dialogue or vice-versa within the same interaction, as one type of prompt may be more effective in a given situation. Mixed dialog prompts must also be able to recognize responses that are not relevant to the immediate prompt, for instance in the case of a user deciding to shift to a function different from the current one.

Higher level IVR development tools are available to further simplify the application development process. A call flow diagram can be drawn with a GUI tool and the presentation layer (typically VoiceXML) can be automatically generated. In addition, these tools normally provide extension mechanisms for software integration, such as an HTTP interface to a web site and a Java interface for connecting to a database.

In telecommunications, an audio response unit (ARU) is a device that provides synthesized voice responses to DTMF keypresses by processing calls based on (a) the call-originator input, (b) information received from a database, and (c) information in the incoming call, such as the time of day. ARUs increase the number of information calls handled and provide consistent quality in information retrieval.

IVR systems are used to service high call volumes, reduce cost and improve the customer experience. The use of IVR and voice automation allows callers' queries to be resolved without the need for queueing and incurring the cost of a live agent. If callers do not find the information they need or require further assistance, the calls are often transferred to an agent. This produces an efficient system, which allows agents have more time to deal with complex interactions. When an IVR system answers multiple phone numbers, the use of Dialed Number Identification System (DNIS) ensures that the correct application and language is executed. A single large IVR system can handle calls for thousands of applications, each with its own phone numbers and script.

Call centers use IVR systems to identify and segment callers. The ability to identify customers allows services to be tailored according to the customer profile. The caller can be given the option to wait in the queue, choose an automated service, or request a callback. The system may obtain caller line identification (CLI) data from the network to help identify or authenticate the caller. Additional caller authentication data could include account number, personal information, password and biometrics (such as voice print). IVR also enables customer prioritization. In a system wherein individual customers may have a different status, the service will automatically prioritize the individual's call and move customers to the front of a specific queue.

IVRs will also log call detail information into its own database for auditing, performance report, and future IVR system enhancements. CTI allows a contact center or organization to gather information about the caller as a means of directing the inquiry to the appropriate agent. CTI can transfer relevant information about the individual customer and the IVR dialog from the IVR to the agent desktop using a screen-pop, making for a more effective and efficient service. Voice-activated dialing (VAD) IVR systems are used to automate routine EnQuiries to switchboard or PABX (Private Automatic Branch eXchange) operators, and are used in many hospitals and large businesses to reduce the caller waiting time. An additional function is the ability to allow external callers to page staff and transfer the inbound call to the paged person. IVR can be used to provide a more sophisticated voicemail experience to the caller.

A Personal Identification Number (PIN) is a alphanumeric password or code used for authentication or identifying users. For example, a telephone phone card would requires the caller to enter their personalized number to authenticate their account.

A Short Message Service (SMS) is a text messaging service component of a telephone, mobile device, and world wide web. It enables telephone devices and internet enabled devices to exchange short text messages with each other using standard communication protocols.

Voice Over Internet Protocol (VOIP), or IP telephony, is a voice communications protocol over internet protocol. It allows users to have two-way voice communication over the internet. VOIP communication digitizes analog voice signals to and transports the digital packets over the internet and then the receiver converts the digital packets back to analog to playback to the listener.

End Glossary

Explanation of Figures

FIG. 1 This diagram teaches how the entire EnQ system works. The EnQ system is separated into two call legs: one call leg that interacts with the customer and another call leg that interacts with the call center. The end goal is to bridge the customer to the call center, in which the customer skips the hold time and avoids disconnects.

The customer interacts with the EnQ system with a desire to reach call center agent (305 FIG. 3) without waiting on hold (142).

The reason why the EnQ system is able to cut the hold time to customers is that it preemptively robo-dials (141) the call center establishing a plurality of lines on hold throughout the call queue and offers the front-of-the-queue calls to customers.

The EnQ system programmatically (312 FIG. 3) generates outbound robot calls (302 FIG. 3) to the call center (315 FIG. 3) to establish calls on hold (141).

From (141), the EnQ system's auto-dialer (144) system setups up by first determining if the call center is open (145) by querying the configuration database (147) to see whether it should call (145), and not call if the call center is closed (146). If the call center is open, the EnQ System will begin making periodic robot calls to the call center (149). The frequency at which the EnQ System calls is determined by previously learned historical hold times and customer demand from the historical call database (140) such that the EnQ system can reliably offer consistent hold times to its customers. For example, the call frequency algorithm (148) would call more often if any of the following are true: 1) the customer demand is high 2) the hold time is high 3) and call center reliability (dropped calls). Once a call frequency is calculated (148), the EnQ system will make consistent robot calls to the call center (149).

The purpose of the robotic outbound call is to navigate the call center IVR call tree (115) and wait on hold (340). The EnQ system gets the sequence of instructions how to navigate the call center IVR from the configuration database (147) and executes on those instructions (115). These instructions can include listening to IVR voice prompts and responding with either DTMFs or voice responses (115). Once the call has successfully navigated the IVR, the EnQ system sends periodic "comfort noise" down the phone line (116). Comfort noise is subtle white noise that keeps the phone line "warm" so that the call center does not perceive that the call was dropped (116).

After navigating the call center IVR, the call center may place the EnQ robot call (302 FIG. 3) on hold (340 FIG. 3) if the call center is busy (120).

During the life of the EnQ robot call, the call center operates in a predictable manner by sending a pattern of media such as DTMFs, sound bytes, and silences (117). If at any time, the media received from the call center is not as expected (i.e. a noisy line) when compared to the pattern stored in the configuration database (147), then the EnQ system will disconnect the call (118), as a conservative measure in order to provide reliable service.

When the call center transfers the EnQ robot call to the agent (305 FIG. 3), there is a specific sequence of soundbytes, DTMF tones, rings, and silences that occur and are unique to that particular call center as stored in the configuration database (147). When the agent detected sequence is found (122), an agent signal (123) is generated for consumption by the rest of the EnQ system.

When the agent signal (123) is received at logic step (129), then the EnQ System will store the hold time (105) to the Call History database (140). Hold time is defined as the length of time from the initiation of the robot call to the agent signal (123). At the agent signal event, the human call center agent will imminently pick up the phone (151). If a customer (303 FIG. 3) is waiting to be bridged (124) to call center, the EnQ system bridges the customer with the Agent (164). The customer may optionally permit third parties (306) to conference the call (172). If there is no customer waiting in EnQ System queue (111), then the robot call will disconnect (168) before the human call center agent picks up the phone. The call history database (140) is updated (179) with the events from that call (310 FIG. 3).

Figure 3:
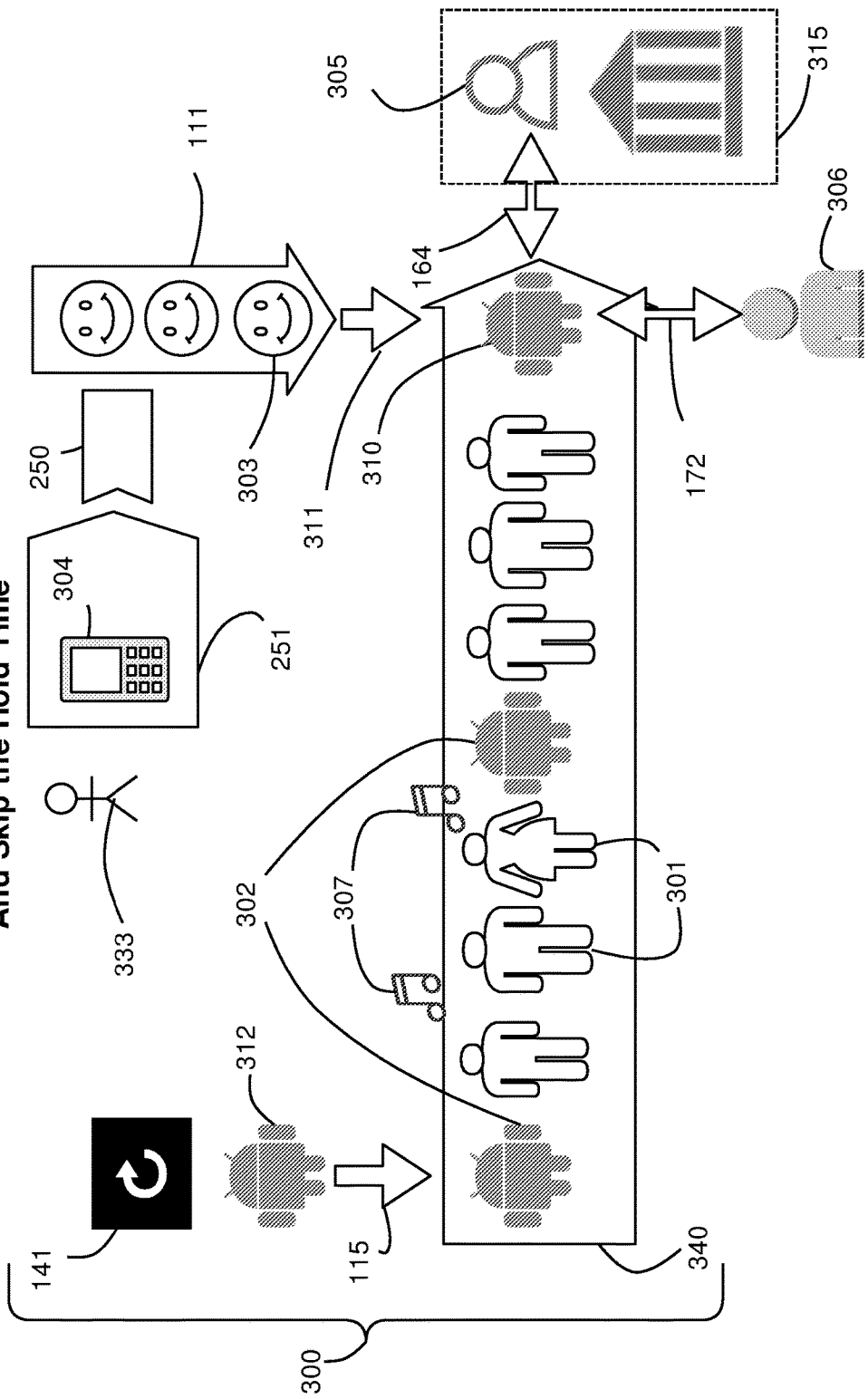
FIG. 3 is a graphic showing customers waiting on hold in line for their call to be answered and the EnQ system cutting in line for its customers.

During the bridge event (164), the front of line EnQ robot (310 FIG. 3) gave its place in line (311 FIG. 3) to the customer call (303 FIG. 3). The EnQ robot call could have existed for hours, while the customer only waited mere minutes. The customers effectively decrease their hold time from hours to minutes (165). In addition, the customer may have been spared of one or more call drops from unreliable call centers by using the EnQ system. This is because they join the robo call after it survived a long wait time with possible disconnects and has successfully reached the call center agent.

The EnQ system advances the state the art of calling call centers by providing the following tangible benefits:
1. Reducing the customer's absolute hold time when trying to reach a call center agent by as much as 95%.
2. Reducing the customer's risk of dropped call(s) disconnects while on hold waiting for agent.
3. Reduces the customer's anxiety, stress, cell charges, and phone battery of the caller from the aforementioned prolonged hold time and disconnects.

For example, real life hold times can exceed 120 minutes to the Internal Revenue Service, Department of Motor Vehicles, Social Security, Unemployment offices, and other similar government services as well as corporate call centers.

This invention is about giving customers the choice of waiting a few minutes instead of two hours in reaching these call centers. The EnQ system advances the state of the art as it employs preemptive calling. The EnQ system's robot calls are on hold even before customers even think of calling the call center. In addition, the EnQ system is adaptive to the call center variability such as hold times and dropped calls as well as responding to customer demand.

Once the customer and agent call completes, the call history database (140) is updated (166), and the customer's account (109) is billed (167).

Callback Via API

Figure 2A:
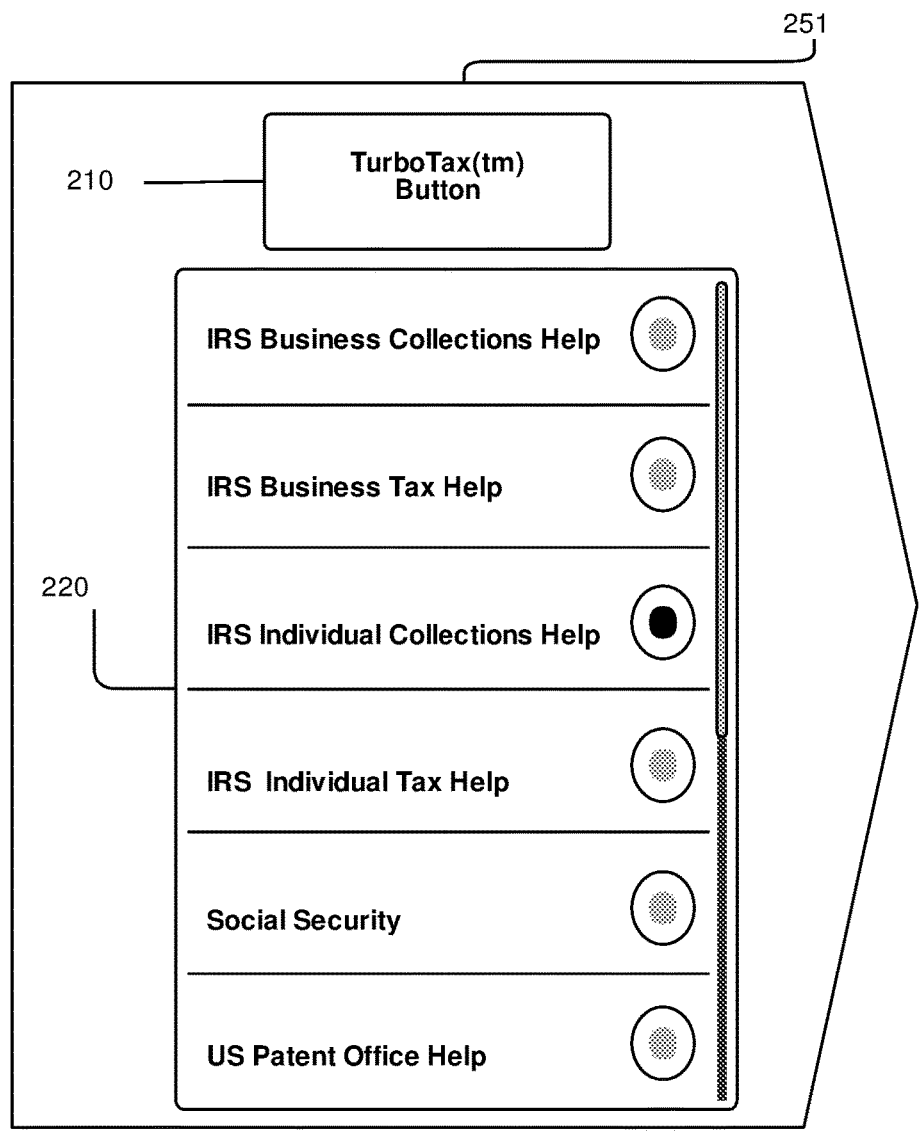
FIG. 2 Teaches how an external 3rd party application such as a website or mobile app can request a callback call from the EnQ system via a Application Programming Interface (API).

The customer (303) (FIG. 3) can interact (142) with the EnQ system by either calling (304) the EnQ system directly or requesting a callback from the EnQ system via an external message (143) from a Web or phone application button (210, 220, 230 FIG. 2).

If the customer interacted with the EnQ system by calling (304 FIG. 3) the EnQ system (100), he/she would follow path (10011 FIG. 1-7). Once connected to the EnQ system, the system would authenticate (101) the customer (303 FIG. 3) by comparing the customer's PIN number with the customer account database (109). The customer is informed if their PIN number is invalid (169) and after a few failed tries, the call is subsequently disconnected (10030). If the customer's PIN number is valid (101), they are quoted the current EnQ system hold time (104) from the Call History database (140) and asked if they would like to proceed with the call (106). If the customer declines, their call is disconnected (107), otherwise the EnQ system will check the customer's billing status (108) from the customer account database (109). If there is a billing issue (108), the customer is informed (110) and given the option to pay by phone (10031). If they decline to pay over the phone their call is disconnected (107). If their billing status (108) is in good standing or they upgrade over the phone (10031), they are placed in the EnQ system queue (111) and listen to EnQ system hold music as they wait to be connected to the next available call center agent (305 FIG. 3) following path (124 FIG. 1-5), which was taught previously.

Callback Via API, Customer Waits for Agent

An alternative way for the customer to interact with the EnQ system is to request a callback from the EnQ system (100) via the internet or SMS as taught in FIG. 2.

For example, a 3rd party desktop application, website, or mobile application could integrate API access to the EnQ system in their software via menu buttons as taught in (FIG. 2). For example, TurboTax™ could include buttons (210 FIG. 2) to call a desired IRS department quickly in their menu (220 FIG. 2) and access the EnQ system via API.

The customer (303 FIG. 3) would initiate the callback process (143) by clicking a button (210 FIG. 2) or Drop down select (220 FIG. 2) or a voice command in a software application such as a desktop application, website, or mobile application (230 FIG. 2). The button click (210 FIG. 2) would send a data packet (251) to the EnQ API (250 FIG. 2). The data packet includes such items as an authorization key, account number (eg. a PIN number), their callback number(s), and which call center department (230 FIG. 2) they wish to connect to. One method of which the data could be transmitted to the EnQ system is via the internet securely via https or encrypted SMS. Once the data packet is received by the EnQ system, the data is validated (10002) by comparing the packet data to the customer account database (109). If the data or credentials are invalid, the customer would get an error message response (10005), and the callback would not execute. If the data is valid, the EnQ system would send a response message that it is processing the callback instruction (10004).

The EnQ system provides the customer with the option (10007) of (A) getting the callback now and waiting for the agent or (B) receiving the callback after the agent connects and having the agent wait for them. The EnQ system allows this choice with some call centers as defined in the configuration database (147). The EnQ system furthers the art by providing customers with different callback options. The customer is warned that by having the agent wait for them that they risk an agent hang up resulting in an additional delay to reaching an agent.

If the customer chooses (10007) that they wish to be called back first and wait for the agent, the EnQ system would call the customer back (10008) on the callback number provided, upon the customer answering the phone within time limit (10009). The customer is quoted current hold time (104 FIG. 1-8) from the call history database (140). After the customer confirms (106 FIG. 1-8), the EnQ system proceeds to bridge the customer to the call center department as already taught above. If the customer did not answer within the time limit (10009), the customer call would be disconnected (10012).

Callback Via API, Agent Waits for Customer

If the customer chooses (10007) that they wish to be called back after the agent was already connected to the line, the EnQ system would wait (10017 FIG. 1-9) until an agent signal is received (129), and then call the customer back (10023). If the agent disconnects the line (10020), then the customer (303 FIG. 3) would be notified (10033) and then hold for the next available agent (305 FIG. 3). He/she is first quoted the current hold time (104 FIG. 1-8) and follow path (106 FIG. 1-8) which was taught previously. Once the agent (305 FIG. 3) is connected to the EnQ robot line (311 FIG. 3), the agent is notified via a voice message (10021) that the customer will be coming on the line soon. If the customer (303 FIG. 3) answers the callback call within the time limit (10025), then they are bridged to the agent (164) and follow path (164 FIG. 1-6) which was taught previously. If the customer did not answer within the time limit (10025) they would be notified by email/SMS/voicemail (10024) that they missed their callback and the EnQ system would select (10027) the next customer in queue (111) if available (10026). If there is no next customer waiting for a callback (10026), the EnQ system would disconnect the agent call (10028).

FIG. 2 External Application Interface teaches how a 3rd party desktop application (260), website, or mobile application (304) could integrate the EnQ API in their software via menu buttons. For example, potential user (333) in TurboTax™ could include buttons (210) to call desired IRS department quickly in their menu (220) and access the EnQ system via API. The selection button could also be included on a mobile app (230) to contact the Department of Motor Vehicles quickly.

The button click action will send a data packet (251) of instructions via the internet/SMS to the EnQ API (250) includes data such as the customer's EnQ account credentials and their callback number(s). The EnQ system would then parse and authenticate this instruction (10002 FIG. 1) and sends message received confirmation to the customer (10004 FIG. 1). Operation (10008 FIG. 1) rings the customer's phone (304) and they would soon be speaking with the agent without waiting hours on hold. This aspect of the invention allows the customer to reach the desired call center quickly without needing to dial any numbers nor even leave their Turbotax™ software.

FIG. 3 SIMPLE_OVERVIEW (300) teaches the invention in the simplest way. The call center (315) often has a long hold time of hours. The public (301) call the call center and queue on hold (340). They listen to hold music (307) and may experience a call drop or disconnect as they journey to the call center agent (305). If they get disconnected, they have no recourse, but to call again without any credit for the time that they had already spent on hold.

The EnQ system (100 FIG. 1) generates robot calls (141 FIG. 1) (312) that navigate the call center IVR tree and then join the call queue (340) on hold.

An EnQ customer (333) would call (304) the EnQ system (100) and join the EnQ system queue (111). The EnQ customer (303) is identified as already waiting in the EnQ customer queue (111). He/she would wait briefly and then take the robot call's place (311) and be bridged (164) to the call center (315) agent (305).

Eventually the robot call will reach the front of the queue (310), and then the EnQ system will detect that the agent is imminent through logic described in (114 FIG. 1) and bridge (311) the EnQ customer (303) to the EnQ robot call (310). The EnQ customer would then be connected to the call center (315) agent (305) quickly. If the EnQ customer queue (111) is empty, then the EnQ system disconnects the robot call (310).

Calls on hold to the call center (340) may be dropped due to the nature of common unreliable call centers or telecommunication glitches. These dropped calls can occur at anytime during the hold period in the call center hold queue (340). An advantage of this invention of the EnQ system includes the plurality of EnQ robot calls (302). The EnQ customer is spared the frustration of the dropped calls as they only join the call center hold queue (340) once an agent is reached (305).

Another way that a customer (333) can reduce their hold time via the EnQ system is to request a callback which was previously taught in FIG. 2 involving the callback request (251 FIG. 2) and the EnQ System (100) receiving and processing the request (251 FIG. 2).

Another aspect of this invention is to permit 3rd parties (306) to conference bridge (172) to the customer call.

FIG. 4 EnQ System Architecture (400) shows a very high level overview of the EnQ system (100). The EnQ system generates automated robot calls to the call center (315) with logic taught in FIG. 1 based on parameters in the configuration database (149).

The customer (333) can call (304) the EnQ system or request a callback via third party API as taught in FIG. 2 (260) to use the EnQ system to connect to the call center agent (305) with minimal waiting on hold.

If a callback is requested via API (251) to the EnQ receiver (250), the EnQ system will call the customer back.

When the EnQ robot call (302 FIG. 3) connects to an agent (305), the customer is bridged (164) to call can talk to the agent without having to wait on hold.

In addition, the customer can request that a 3rd party (306) be conferenced (172) to the call.

The EnQ system stores call data in the call history database (140) used to estimate hold times and adapt robo call frequency to call center loads. The customer account data in the customer account database (109) is used for billing and logging validation.

An optional feature is to transcribe and/or record the bridged call. An encryption algorithm to record and transcribe the bridged calls can be used.

While a number of exemplifying features and embodiments have been discussed above, those of skill in the art will recognize certain modifications, permutations, additions and subcombinations thereof. No limitation with respect to the specific embodiments disclosed herein is intended or should be inferred.

I claim:

1. A telecommunications robot comprising:
   a. a processor adapted to make several outgoing calls to a customer service center that maintains an incoming call queue and the processor maintains some of it's outgoing calls in a hold mode in the customer service center incoming queue;
   b. said processor then bridging an incoming client call onto one of the calls on hold in the customer service center's incoming call queue;
   c. said processor putting the incoming call on hold until a call to the customer service center is connected;
   d. said processor determining an imminent agent is coming onto a call on hold mode at the customer service center; and
   e. said processor bridging the incoming client call to the call on hold mode at the customer service center when the determining an imminent agent is coming onto a call on hold mode, or the agent is already on the line, thereby creating a bridged call.

2. The robot of claim 1, wherein the processor provides to a new client call an option to pay extra to step ahead of prior client calls.

3. The robot of claim 1, wherein the processor receives a new client call back request, stores the call back request and upon determining an imminent agent is coming onto a call on hold, or is actually on the line, calls back the call back request and bridges the call back request call to the call with the imminent agent.

4. The robot of claim 1, wherein the processor hangs up on the imminent agent call if no client call is on hold to bridge to the customer service center.

5. The robot of claim 1, wherein the processor uses Interactive Voice Response (IVR) software to guide all incoming client calls throughout the steps to the bridged call.

6. The robot of claim 1, wherein the processor offers a new client call a hang up if the new client does not want to wait an estimated wait time that the processor has announced.

7. The robot of claim 1, wherein the processor calculates using a history analysis of prior wait times and current client call activity an estimated wait time.

8. The robot of claim 1, wherein the processor senses a silence and/or a call transfer detection and/or dtmf(s) and/or sound bytes and/or a human breath that the imminent agent is coming onto a call.

9. The robot of claim 1, wherein the processor uses a code number to conference multiple client calls into a single bridged call.

10. The robot of claim 1, wherein the processor generates a noise signal to the calls that are on hold to the customer service center so as to avoid a hang up based on a dead call.

11. The robot of claim 1, wherein the processor computes how many outgoing calls to the customer service center should be made based on current hold times and/or past historical calls and/or when the last live call was made and/or how many clients are currently waiting in the incoming call queue and/or a recent history of how often the customer service center hung up on calls.

12. The robot of claim 1, wherein the processor computes a client charge based a bridged call.

13. A telecommunication system comprising:
   a. an outgoing phone call robot means functioning to initiate multiple request calls to a customer service center;
   b. an incoming client call processor means functioning to receive and store in a client queue a plurality of incoming client calls, each of which is awaiting a bridge connection to an existing call to the customer service center;
   c. an outgoing call processor means functioning to sense an imminent or actual connection to a human; and
   d. a bridge processor means functioning to connect a call in the client queue to an outgoing request call when the outgoing call processor means senses the imminent or actual connection to a human on the outgoing request call.

14. The telecommunication system of claim 13 further comprising a billing processor means functioning to invoice a client for the client's incoming client call that is bridged to the customer service center.

15. The telecommunication system of claim 13, wherein the bridge processor means further comprises a hang up function that senses an absence of any incoming client calls in the client queue and hangs up the outgoing call request when an imminent connection to a human is detected.

16. The telecommunication system of claim 13, wherein the incoming client call processor means further comprises an application residing in a remote computer that triggers a request for a bridge connection, wherein the incoming call processor means calls a designated client upon the sensing of an imminent or actual connection to a human on an outgoing request call.

17. A multi-line phone robot comprising:
   a. an incoming client call processor that stores a plurality of incoming client request calls in a client queue;
   b. a call generator that maintains a plurality of outgoing calls to a customer service center;
   c. a human agent sensor processor that senses an imminent or actual connection to a human on an outgoing call that has been placed on hold at the customer service center; and
   d. a bridge processor that connects a call in the client queue to the outgoing call when the imminent or actual connection to a human is sensed, creating a bridged call.

18. The robot of claim 17 further comprising a billing processor to invoice a client for the bridged call.

19. The robot of claim 18 wherein the billing processor provides a client option to pay extra to step in front of other prior client calls.

20. The robot of claim 17 further comprising a processor that analyzes an historical hold time database to compute an estimated hold time.

* * * * *